United States Patent Office 3,270,800
Patented Sept. 6, 1966

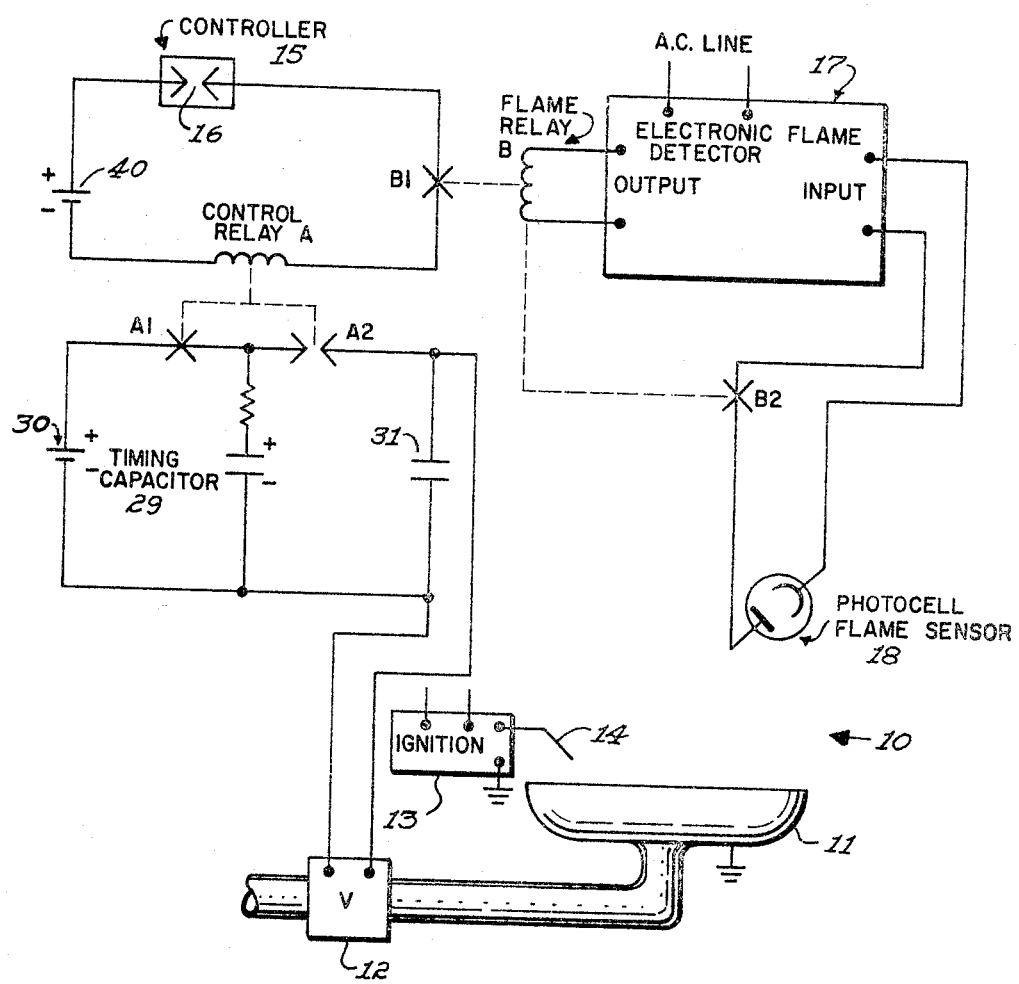

3,270,800
BURNER CONTROL APPARATUS
Fred T. Deziel, Bloomington, and Balthasar H. Pinckaers, Edina, Minn., assignors to Honeywell Inc., Minneapolis, Minn., a corporation of Delaware
Filed Dec. 7, 1964, Ser. No. 416,320
7 Claims. (Cl. 158—128)

This invention is concerned with an improved burner control apparatus and particularly with a burner control apparatus constructed and arranged to provide safe and reliable direct ignition of an associated fuel burner unit.

Our invention finds particular utility when utilized to control a fuel burner installation having a main fuel burner and a normally closed, electrically energizable fuel valve controlling the flow of fuel to this main burner. The fuel is ignited as it issues from the main burner by a direct ignition means, as by an ignition transformer providing a high voltage spark. With such a construction, it is necessary that a minimum quantity of unburned fuel be allowed to issue out of the main burner during a short trial-for-ignition period, in the event that ignition is not established. This short trial-for-ignition time period is necessary to prevent a dangerous accumulation of unburned fuel in the vicinity of the main burner.

We are aware of prior art devices which broadly provide a trial-for-ignition time. These prior art devices generally allow a controlled quantity of fuel to issue from the main burner and interrupt the supply of fuel if flame is not established during the trial-for-ignition time period. We, however, have observed that the prior art devices are unsatisfactory for at least two reasons. The first of these is that prior art devices are incapable of providing relatively short trial-for-ignition periods, for example in the range of a maximum period of four seconds. Also, we have observed that the prior art devices are capable of failure in that the structure providing the trial-for-ignition timing is merely a pilot control which controls a main control source of operating voltage for the fuel valve. With such a structure, one cannot be certain that the main control will respond to the pilot control due to possible failures in the device which controls the main source.

To overcome the deficiencies of the prior art, we have originated a unique structure whereby we utilize a timing capacitor which is charged with electrical energy and is then switched to provide a sole source of operating voltage for the fuel valve to thereby cause the valve to open. By virtue of the fact that our charged timing capacitor is the sole source of operating voltage, and not a source of pilot control for a main operating control, for example a main operating control such as an electron discharge device whose output is connected to energize the valve, we can be certain that the valve will be operatively energized and remain operatively energized for only a relatively short trial-for-ignition period, as determined by the discharge rate of the capacitor. This discharge rate can very easily be controlled to be in the range of a maximum of four seconds. This structure is a fail-safe structure in that the valve will open only if the capacitor is charged and will remain open only so long as the capacitor charge has not been dissipated below a level necessary to maintain the valve in an open condition. Our structure further provides a flame detector which responds to the successful establishment of the ignition during the trial-for-ignition period. The flame detector provides an output to maintain the timing capacitor charge if flame is successfully established. In the event that flame is subsequently extinguished, the flame detector interrupts the charging of the capacitor and the capacitor then again institutes a short timing period after which the valve is closed.

We are aware of prior art devices such as motor driven timers, bimetal timers, and capacitor timers controlling electron discharge devices and the like, which, in one manner or another, provide a trial-for-ignition period. All of these devices, however, are capable of failure in that one cannot be certain that they will actually produce the timing function. Furthermore, the majority of these devices are incapable of providing the short time period which is necessary when a main burner is directly ignited as by a spark igniter. For example, when a bimetal timer is used, a relatively short time period in the nature of a few seconds is difficult if not impossible to achieve. Furthermore, with a bimetal timer one cannot be certain that the timer will provide its necessary switching function at the end of trial-for-ignition-period. The structure of our invention, however, is a fail-safe structure in that the use of the charged timing capacitor as a sole source of operating voltage for the fuel valve insures that under no condition is it possible for the fuel valve actuator to remain operatively energized after a given quantity of energy has been dissipated in maintaining the valve in an energizing condition throughout the trial-for-ignition-period. The only source available for this energy is the charged capacitor and once this energy has been dissipated, the actuator of the fuel valve must be operatively de-energized. It is only the successful establishment of flame which maintains the capacitor charged and the valve energized.

Our invention will be apparent to those skilled in the art upon reference to the following specification, claims, and drawing, of which the single figure is a schematic representation of one embodiment of our invention.

Referring to the single figure, reference numeral 10 designates generally a fuel burner installation having a main fuel burner 11, a normally closed electrically energizable fuel valve 12, and spark ignition means 13 whose ignition electrode 14 cooperates to produce a spark between the electrode and the burner 11.

The control of the fuel burner installation 10 is achieved by a controller 15. This controller may be a bimetal thermostat located in an area to be heated by operation of the fuel burner installation, and comprises a normally open switch 16 which is adapted to close upon a need for operation of the fuel burner installation 10. Connected in circuit with controller 15 is a control relay A having normally closed switch A1 and normally open switch A2. By physical design, switches A1 and A2 cannot be both closed at the same time.

Reference numeral 17 identifies an electronic flame detector having input terminals connected to a photocell flame sensor 18 and having output terminals connected to the winding of a flame relay B. Flame relay B controls the normally closed switches B1 and B2. Electronic flame detector 17 is of the continuous component checking type in which the winding of the flame relay B is de-energized in the absence of flame and controls the switch B2 to achieve an output-to-input feedback. So long as switch B2 is closed (the no-flame condition of flame relay B) photocell flame sensor 18 is operatively connected to the input terminals of flame detector 17. The detection of flame by flame sensor 18 is effective to cause energization of the winding of flame relay B and thereby cause the switches B1 and B2 to open. The opening of switch B1 simulates the absence of flame at the input of flame detector 17, and thus, the winding of flame relay B is de-energized. The closing of switch B2 again provides a flame signal to the input of flame detector 17 and in this manner, the winding of flame relay B cycles between an energized and a de-energized condition so long as flame sensor 18 continuously detects the presence of flame at the fuel burner installation 10.

Referring now to the operation of our invention, the apparatus is shown in the standby condition. In this condition, a timing capacitor 29 is connected to a source of D.C. voltage 30 and is charged to the polarity indicated. The circuit connecting timing capacitor 29 to source 30 includes the normally closed switch A1 of control relay A. Furthermore, A.C. line voltage is applied to the power supply terminals of electronic flame detector 17 and this detector is operative. However, valve 12 is closed and flame is not present at the burner 11, thus flame relay B exists in its no-flame condition (the relay winding is deenergized).

If it is now assumed that there is a call for operation of the fuel burner installation 10, this call is evidenced by the closing of switch 16 of controller 15. The winding of control relay A is now connected in circuit with a source of D.C. voltage 40 and is energized to open switch A1 and to close switch A2. Timing capacitor 29, now charged, is connected to a parallel combination of a further capacitor 31 and the electrically energizable operator of valve 12. The resultant voltage applied to valve 12 is effective to cause this value to open and allow fuel to flow to burner 11, where the fuel is subjected to the spark provided by ignition electrode 14. As we have mentioned, valve 12 will remain open so long as sufficient electrical energy flows from timing capacitor 29 to maintain this valve in the open condition. The longer the valve is open, the less energy remains available at timing capacitor 29. After a given trial-for-ignition period, timing capacitor 29 has been sufficiently discharged to cause valve 12 to again close.

Normally, however, during this trial-for-ignition period, flame is successfully established at burner 11 and is detected by flame sensor 18. The detection of all flame causes the winding of flame relay B to be energized and switches B1 and B2 open. The opening of switch B1 causes the winding of control relay A to be de-energized and, as a result, switch A2 opens and switch A1 closes. The closing of switch A1 again connects timing capacitor 29 to the source of voltage 30 to recharge this capacitor. The valve will not close at this time due to the voltage now on capacitor 31. However, the recharging of this capacitor will shortly be interrupted by virtue of the opening of the feedback switch B2 which will result in de-energization of flame relay B.

Flame relay switch B2 is connected in circuit with flame sensor 18 and effectively disconnects the flame sensor from the input of flame detector 17. This has the effect of simulating the absence of flame and flame detector 17 causes the winding of flame relay B to return to its no-flame condition, that is, the winding is de-energized. As a result, the switches B1 and B2 of the flame relay again close.

The closing of switch B1 of the flame relay again energizes the winding of control relay A and timing capacitor 29, which has now been recharged, is again connected to the parallel combination of capacitor 31 and the actuator of valve 12. Furthermore, the closing of flame relay switch B2 again connects the flame sensor 18 to the input of flame detector 17 and since flame is present, flame relay B is again energized.

This cyclic sequence of events is repeated, as an example at an approximate rate of one cycle per second, the flame relay B and the control relay A cycling at this rate. As a result, timing capacitor 29 is effectively maintained continuously charged and valve 12 remains open so long as flame is present at burner 11.

If it is assumed that the flame is accidentally extinquished, the flame relay B is de-energized and remains de-energized, causing control relay A to remain continuously energized and thus maintaining switch A1 continuously open and switch A2 continuously closed. After a short time period, the electrical energy available at timing capacitor 29 is dissipated and valve 12 closes. This is the lock-out condition of the control apparatus. In order to reset the control apparatus from this lock-out condition, it is necessary to open controller 15, causing control relay A to be de-energized and causing timing capacitor 29 to be connected to source 30 where it may be recharged. Subsequent closing of controller 15 again institutes the above described cycle of events, wherein a trial for ignition period will be instituted in an attempt to re-establish flame at the fuel burner installation.

From the above description, it can be seen that we have provided a simple and yet a reliable structure for providing a short and predictable trial-for-ignition period to facilitate the control of a direct ignition fuel burner installation. We have achieved this new and unusual result by virtue of the use of a charged capacitor as a sole source of operating voltage for the fuel valve, to thus insure that it is impossible for the fuel valve to remain energized after the trial for ignition period. Modifications of our invention will be apparent to those skilled in the art and it is therefore intended that the scope of our invention be limited solely by the scope of the appended claims.

We claim as our invention:

1. A direct ignition burner control for use to control the direct ignition of a main fuel burner, comprising;
   a timing capacitor adapted to accumulate a charge of electrical energy,
   means responsive to a need for operation of the main fuel burner effective to connect said capacitor to electrically energizable means which is adapted to cause fuel to flow to the main burner, to thereby energize said electrically energizable means as the sole source of electrical energy and for a short trial for ignition period determined by the discharge time of said timing capacitor,
   and flame detecting means effective upon the establishment of flame at the main fuel burner to maintain a charge of electrical energy at said timing capacitor and thereby maintain fuel flow.

2. A burner control apparatus for use with a fuel burner installation having a fuel burner and a normally closed fuel valve and having ignition means to directly ignite fuel flowing out of the burner, wherein it is permissible to allow fuel to flow out of the burner for only a relatively short trial-for-ignition period to prevent a dangerous accumulation of unburned fuel in the vicinity of the fuel burner, the control apparatus comprising:
   a timing capacitor selectively connected to a source of voltage to accumulate a quantity of electrical energy in the form of a charge and then disconnected from said source of voltage and connected as a sole source of operating voltage to energize the fuel valve for a short trial-for-ignition period as determined by the discharge time of said capacitor;
   and a flame detector having output means to maintain the charge on said capacitor upon the successful establishment of flame at the burner within the trial-for-ignition period.

3. In a direct ignition burner control apparatus for use with a controller to control a normally closed valve which is connected in a fuel conduit to allow fuel to flow to a burner when the valve is open, and having ignition means to ignite fuel at the burner, the control apparatus comprising;
   a flame detector adapted to sense the presence or absence of flame at the burner and having output switching means controlled in accordance therewith,
   control switching means adapted to be controlled by the controller and by said output switch means and to be actuated when said flame detector senses the absence of flame at the burner and when the controller indicates a need for burner operation,
   a capacitor,
   means connecting said capacitor to a source of voltage to charge the same only when said control switching means is not actuated,
   means controlled by said control switching means when actuated connecting said capacitor as a source of energizing voltage to electrically energizable means adapted to open the valve, whereupon the valve remains open for a trial for ignition time period as determined by the discharge time of said capacitor, and means controlled by said output switching means maintaining said capacitor charged in the event flame is detected within said trial for ignition time period.

4. In a direct ignition burner control apparatus having a flame detector to detect the presence or absence of flame at a fuel burner and to control the state of operation of a flame relay in accordance therewith, and in which a controller responsive to the need for burner operation controls the state of operation of a main control relay, the improvement comprising;

a capacitor, first circuit means connecting said capacitor to a source of voltage to charge said capacitor, electrically energizable means effective when energized to cause fuel to flow to the fuel burner, means including second circuit means controlled by the main control relay and effective upon a need for burner operation to effect modification of said first circuit means to prevent further charging of said capacitor, and to connect said capacitor as a sole source of energizing voltage to said electrically energizable means, the time period of discharge of said capacitor constituting a time period in which ignition may take place at the fuel burner, and means controlled by the flame relay and effective upon the detection of flame to maintain said capacitor charged.

5. In a burner control apparatus constructed and arranged to provide a given quantity of electrical energy to open a fuel valve for a trial-for-ignition period and to insure closing of the fuel valve at the end of this period if ignition has not taken place, comprising;

a timing capacitor, voltage supply circuit means including said capacitor effective to charge said capacitor with a quantity of electrical energy, circuit means operative upon a need to open the fuel valve and effective to interrupt the charging of said capacitor by said voltage supply circuit means and to connect said capacitor to the fuel valve to open the valve for a trial-for-ignition period as determined by the discharge rate of said capacitor, and means responsive to ignition and effective to maintain said capacitor charge and thereby maintain the valve open.

6. In combination;

a control relay having an actuator and switch means, a flame detector having flame sensing means adapted to sense the absence or presence of flame at a fuel burner, having a flame relay including switch means, and having output-to-input feedback means causing said flame relay to continuously cycle from a flame-state to a no-flame-state in the presence of flame, energizing circuit means for the actuator of said control relay and including the switch means of said flame relay adapted to energize said actuator only when said flame relay is in said no-flame-state, a timing capacitor, voltage supply circuit means including the switch means of said control relay and effective to charge said capacitor when the actuator of said control relay is de-energized, and further circuit means including the switch means of said control relay and adapted to connect said capacitor to a fuel valve actuator as the sole source of energizing voltage therefore, to thereby cause the valve to be initially open for a short trial for ignition period as determined by the discharge time of said capacitor, and to be maintained open only if a resulting flame is detected so as to cause the charge of said timing capacitor to be maintained.

7. Burner control apparatus for use with a fuel burner installation having a normally closed electrically operable fuel valve arranged to control the flow of fuel to a fuel burner and having ignition means to directly ignite the fuel at the fuel burner, the control apparatus comprising;

a control relay having a winding and switch means controlled thereby, the flame detector having flame sensing means adapted to sense the absence or presence of flame at the fuel burner and having an output flame relay with a winding and switch means controlled thereby, said flame detector having output-to-input feedback means to maintain the winding of the flame relay de-energized in the absence of flame and to cause the winding of the flame relay to be cyclicly energized and then de-energized in the presence of flame, circuit means for energizing the winding of said control relay on a need for operation of the fuel burner, said circuit means including a switch of said flame relay which is closed when the winding of said flame relay is de-energized, a timing capacitor, first circuit means including a switch of said control relay which is closed when the winding of said control relay is de-energized connecting said timing capacitor to a source of voltage to charge said capacitor, and second circuit means controlled by a switch of said control relay which is closed when the winding of said control relay is energized adapted to connect said timing capacitor as a sole source of operating voltage to the actuator of the fuel valve to thereby open the fuel valve and maintain the valve open for a relatively short trial-for-ignition period as determined by the discharge time of said capacitor, the successful ignition of the fuel at the fuel burner being effective to cause said flame relay to cycle and thereby institute cycling of said control relay, whereupon the charge of said timing capacitor is maintained and the fuel valve is maintained open beyond the trial-for-ignition period.

References Cited by the Examiner

UNITED STATES PATENTS

| 2,747,112 | 5/1956 | Deziel et al. | 158—28 X |
| 2,798,213 | 7/1957 | Rowell. | |
| 2,839,132 | 6/1958 | Blackett et al. | 158—124 |
| 3,202,976 | 8/1965 | Rowell | 158—28 X |

FREDERICK KETTERER, *Primary Examiner*.